Jan. 3, 1961    L. BORDIGNON ET AL    2,966,721
DEVICE TO MAKE CENTERING SEATS ON EITHER ENDS OF BARS OR
THE LIKE, IN ORDER TO KEEP THEM FIRMLY CHUCKED
DURING THE SUBSEQUENT MACHINING OPERATIONS
Filed Oct. 15, 1956    2 Sheets-Sheet 1
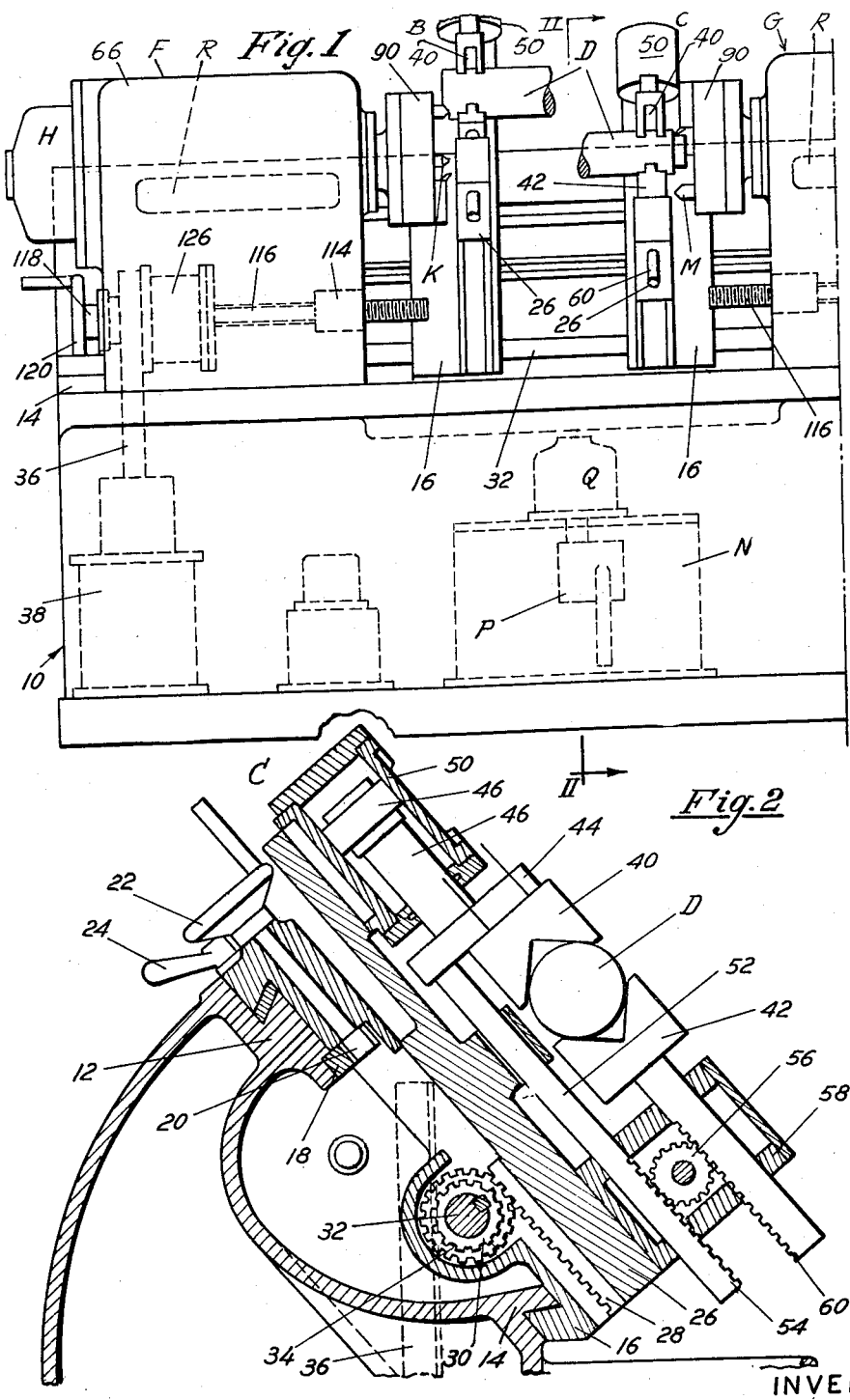
INVENTORS
L. BORDIGNON
G. L. TOVAGLIERI

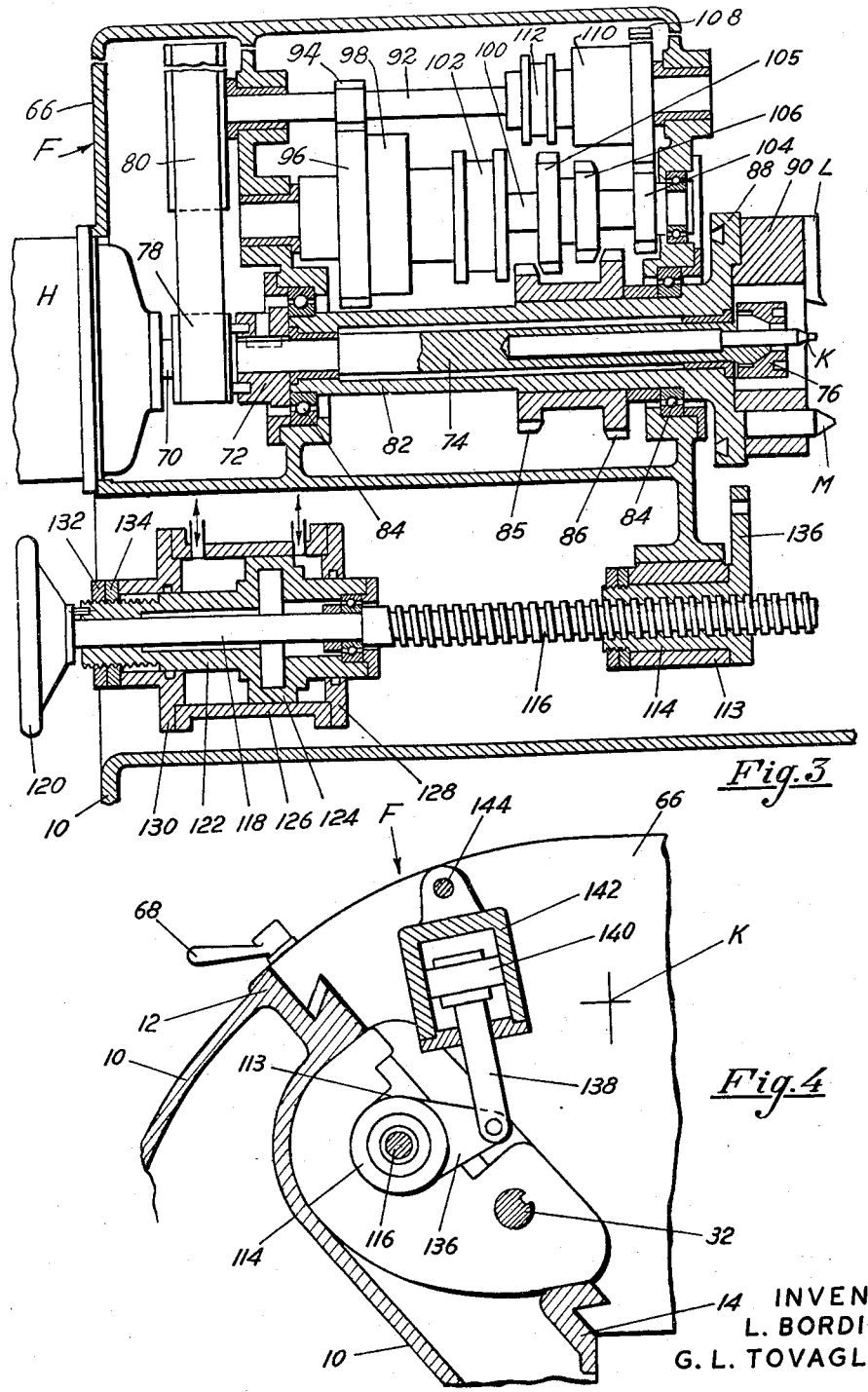

United States Patent Office 2,966,721
Patented Jan. 3, 1961

2,966,721
DEVICE TO MAKE CENTERING SEATS ON EITHER ENDS OF BARS OR THE LIKE, IN ORDER TO KEEP THEM FIRMLY CHUCKED DURING THE SUBSEQUENT MACHINING OPERATIONS

Lelio Bordignon and Gian Luigi Tovaglieri, Busto Arsizio, Italy, assignors, by mesne assignments, to Tovaglieri & C. Soc. II per Azioni, Busto Arsizio, Italy, a company of Italy Filed Oct. 15, 1956, Ser. No. 615,924

3 Claims. (Cl. 29—27)

This invention relates to a device to make centering seats—as required to perform further machining operations, as turning, milling, etc.—on either ends of bars or the like.

In continuous production in machine shops, it is often required to have pieces cut off from bars, each of which must have a pre-established, exact length, and have usually cone shaped seats on its faces, accurately centered on its longitudinal axis, pieces may be clamped between centers and held in their exact positions while being machined, as, on lathes.

Up to now, the above operations have been performed on lathes which can give only low performance, being not suitable for a production on a larger scale.

The device according to the invention allows a quick and easy machining of centering seats on one or both ends of a bar.

Moreover, it is possible, according to this invention to have the workpiece of the exactly required length.

The device according to the invention also allows to turn off a given length of one or both ends of the workpiece, in order to have it properly chucked in conventional chucks.

An advantageous embodiment of the device is disclosed in the following description, taken with the accompanying drawings.

In the drawings:

Fig. 1 is a front view elevation of the device according to the invention.

Fig. 2 is a cross-section, on a larger scale, along the line II—II of Fig. 1.

Fig. 3 is a longitudinal section of one of the heads with which the device is provided.

Fig. 4 is a cross-sectional view of a detail of Fig. 3.

The device as shown consists of a bench 10, provided with ways 12 and 14 fitted on its upper face in such a manner as to lay on a plane at an angle of 50° to the horizontal plane. One, or two chucking units B and C for the workpiece D are slidingly fitted on said ways and can be clamped on any point thereof. In Fig. 1, said chucking units B and C are shown in two of their operating positions, i.e.; in the position of the unit B, the "heading" or facing operation is just being started, while in the position of chucking unit C, the axis of workpiece D is aligned with the centering position thereof. One, or two units F and G, to center and turn off the workpiece D respectively are located on the same ways 12, 14 opposite to chucking units B—C.

Since both chucking units B and C, as well as both centering heads F and G are like, it will be sufficient to describe hereinafter only one of them.

Referring particularly to Fig. 2, each chucking unit consists of a carriage 16, slidingly fitted on the ways 12 and 14, by means of a rack 18 secured to ways 12, and of a pinion 20 engaged with said rack and secured to a control handwheel 22. The carriage 16 can be locked in the required position on the ways of bench 10, by means of suitable locking devices 24, acting on the ways 12.

The carriage 16 is provided, in its turn, with ways, located orthogonally to ways 12 and 14, and whereon a slide 26 is fitted. A pinion 30, which can be caused to slide in its axial direction but rotatably connected with a bar 32, parallel to ways 12 and 14 engages with a rack 28, secured to the lower side of slide 26. A second pinion 30, forming part of the second locking device is also keyed on the same bar 32, whereby both slides 26 can be synchronously moved.

A further pinion 34 is keyed on one or both ends of said bar 32; such pinion (or pinions) engages with a rack 36, fitted on the extension of the rod of a piston, that works in a cylinder 38 fitted within the bench or base 10 of the machine. In Fig. 1 of the drawing, two cylinders 38 are shown on both ends of base 10, and both pistons of said cylinders act on bar 32, whereby a smooth and uniform control of both slides 26 takes place, above all in the case of unusually long machines.

Pairs of gripping jaws 40—42, showing gripping faces suitably shaped according to the shape of workpiece D, which is to be chucked, are slidingly fitted on suitable ways with which the slide 26 is provided. In the case in question, V-gripping faces are formed on said jaws, one side of the V being at an angle of 5° to the horizontal.

The purpose of such a slight inclination of said face toward the top is to obtain an easier seating of the workpiece D in the lower jaw 42.

The jaw 40 is secured to a plate 44, to which is also connected the rod 46 of a piston 48, working in a cylinder 50 fastened to the slide 26.

A rod 52, located parallel to the rod 46, and connected also with the plate 44, is provided at one of its ends with a rack 54, engaged with a pinion 56, that is fitted on a support 58, secured to the opposite end of the slide 26.

Said pinion 56 also engages with a like rack 60, slidingly fitted on the same support 58, and secured at one end to the jaw 42.

It follows that when actuating the piston 48 both jaws 40 and 42 will be actuated at the same time and with the same speed thus performing exactly equal strokes in opposite directions, whereby the axis of workpiece D registers always the machine axis.

The direction of the motion accomplished by the jaws 40—42 in respect of the horizontal plane has been properly selected in order to allow an easy setting of the workpiece, both by hand and by a hoist (in the case of very heavy workpieces).

In the embodiment as shown, such direction of motion is an angle of 50° to the horizontal plane, whereby the workpiece D, when set between the jaws, can easily settle in the seat of jaw 42.

Since each pair of jaws 40—42 with which the gripping units B and C are fitted, has its own control, device, i.e. the piston 48 and associated cylinder 50, it is to be understood that no difficulty takes place in gripping workpieces D even if they have different diameters.

Each centering and facing unit F and G, to work on a piece D, is slidingly fitted at opposite positions on the ways 12—14 of base 10, as shown in the Fig. 1. Each of such units consists of a casing 66, within which the gearings are fitted, and the lower side slides along the ways 12 and 14. Such casing can be locked in any required position on the ways 12 and 14 by means of a locking device, that consists in a lock 68, like lock 24 of chucking units. The shaft 70 of an electric motor H, fitted on the outside of casing 66 (see Figs. 3 and 4) is connected, through a resilient coupling 72, with a spindle 74, which extends out of the opposite end of the casing 66, and is provided with a chuck 76, in which a centering drill K or other like tool can be gripped.

On the same shaft 70 of said motor is also keyed a pulley 78, by which a second pulley 80 is driven. From this latter pulley, the drive of other machine members is derived.

The section of spindle 74 extending inside the casing is arranged within a hollow spindle 82, so that both spindles are coaxial and adjacent one another. Such hollow spindle is fitted on bearings 84 secured to casing 66, and a pair of gears 85 and 86 are keyed on one end thereof, whereas a chuck 88 is secured on the opposite end of the same hollow spindle, that extends out of casing 66.

A tool holder 90 is secured, in any suitable way, to the chuck 88, and in such tool holder, tools L can be chucked to turn a length of workpiece D, or M for the facing or heading of the associated end of the same workpiece.

Said tools L and M are gripped in the tool holder in such a manner as to allow an adjustment thereof, according to the diameter which is to be turned, and to the features of facing or like machining operation.

Two or more tools can also be set in the tool holder 90, in case a stepped piece is to be turned.

As shown in Fig. 3, the centering drill K is fitted inside the tool holder 90 and its end is substantially aligned with the end of tool L, whereas the end of tool M comes forth with respect to the tips of both aforestated tools, for the purposes which will be hereinafter stated.

The above specified pulley 80 is keyed on a shaft 92, fitted on bearings secured to casing 66 and whereon a pinion 94 is also keyed. The latter pinion engages with a mating gear 96, secured to the loose member of a friction coupling 98, being the other member of the same coupling keyed on a shaft 100, arranged parallel to shaft 92, and controlled by means of a collar 102, which is acted upon by a fork lever of the conventional type.

A gear 104 and a pair of gears 105 and 106 are keyed on said shaft 100. The latter pair of gears can be caused to slide axially but they are rotatably connected with the shaft 100; being thereby brought into engagement with either of the aforestated gears 85 and 86.

The gear 104 engages in its turn with a gear 108, secured to the loose member of a friction coupling 110, the other member of said coupling being rotatably keyed on the shaft 92 and provided with a control collar 112.

The means by which said couplings 98 and 112 are thrown into or out of engagement, are interlocked, whereby when engaging one of such coupling or clutches, the other, disengages and vice-versa. Thus, the hollow spindle 82 can be driven at the required r.p.m., by establishing between it and the motor H any of the operational driving controls which can be carried out by engaging either clutches and gear drives 85—86 or 105—106.

A nut 114 is fitted in a bushing 113 with such a clearance as to allow a swinging motion thereof and said bushing is secured to lower end of casing 66 (see Figs. 3 and 4). A screw 116 arranged parallel to spindles 74—82 and having one end screwed into the nut 114, is provided on its opposite end with a rod 118 firmly secured to a control handwheel 120, fitted on one end of machine as can be seen on Fig. 1.

Said rod 118 is rotatably fitted in a tube 122, showing on its middle section a rim 124, acting as a piston in a cylinder 126, secured to base 10 of the machine.

Said tube 122 (acting as the rod of piston 124) is slidingly fitted on guides of the covers 128 and 130 of cylinder 126, for purposes which will be hereinafter stated, and a thread is cut toward its outer end. A ring and counter-ring nut unit 132—134, screwed into said threading cooperates with the outside face of cover 130, thereby acting as a limit stop for the travel of piston 124 and thus of screw 116.

The nut 114, that is axially held in the bushing 113, is provided on one end with an arm 136, to which the rod 138 of a piston 140 sliding in a cylinder 142 is hinged (see Fig. 4). Latter cylinder is also hinge connected by means of the pin 144 to the side of casing directed toward the B and C units.

The machine is completed by a tank N for the operating fluid which is pressurized by a pump P, driven by a suitable electric motor Q (see Fig. 1).

The different control and actuating members and particularly the distributors for the actuating units 38—50—126—142, the interruptors for the motors and so on are suitably arranged on the base 10, in order to have the different devices actuated in the required sequence, as hereinafter stated and according to the different operation cycle of machine. In the starting position of machine, the units F and G are moved away from one another, and from chucking units, i.e. with the piston 124 (see Fig. 3) in its left end stroke position.

The piston 140, on the contrary, must be actuated in such a manner as to move the associated units F, G from left to the right (see Fig. 3), in respect of screw 116, thereby bringing the tools K, L and M near the workpiece D, i.e. the same piston 140 (see Fig. 4) must be raised, when the screw 116 shows a right hand thread, or lowered when a left hand thread is cut on same screw, to obtain the aforespecified condition.

The piston 48 of chucking units B—C must be in its raised position, to keep the jaws 40—42 away the one from the other.

The piston of cylinder 38 must be in its lowered position, to keep the slides 26 of units B and C in their upper end stroke position, as shown in the left side of Fig. 1, wherein all tools K—L—M are disengaged from workpiece D.

The chucking units B and C must be brought in the position as required by the final features of workpiece D, on the ways 12 and 14, by means of handwheels 22, and locked in such positions by means of the locks 24.

The same is for the units F—G, which are moved along same ways by means of the associated handwheels 120. Then the position of threaded rings 132—134 (acting as adjustable stops) on tube 122 is suitably adjusted, thereby limiting and defining the useful stroke of piston 124, and thus also the stroke of tools K and L as fitted on the associated unit.

The settling of chucking units B—C as well of centering units F—G is made by scales and references signs easier engraved both on the base 10, and on the lower end of said units.

After performing the above preparatory operations, the workpiece D is settled between the jaws 40—42, and pressure fluid is fed into the upper chamber of cylinders 50, in order to force same jaws against said workpiece.

Then both motors H are started in order to drive the hollow spindle at the required r.p.m., whereupon pressurized fluid is allowed to flow into the cylinder 38 to have the slides 26 brought simultaneously downward at the established speed.

The workpiece D is thus faced by the tools M as set in the toolholder 90 and which are brought to work the ends of same piece D so that a preestablished length thereof is obtained. At the end of such operation, the distributor by which the flow of pressurized fluid into the cylinders 38 is increased, must be actuated, thereby bringing the slides 26, with the workpiece D, at an increased speed, into an exactly preestablished position wherein the axis of said workpiece registers with the axis of spindles 74—82. During such stroke of slides 26, pressurized fluid is fed into both cylinders 142, for the purposes which will be hereinafter stated.

The turning and centering step starts after reaching of the aforespecified position by the workpiece D; the hollow spindle 82 is driven at the required r.p.m. by the motor through a corresponding operation drive whereas the spindle 74 is directly actuated by same motor H. Pressurized fluid is fed into the outer chambers of cylinders 126 (i.e. in the left chambers as seen in the Fig. 3) to have the piston 124 acted upon by same fluid, whereby the tools K and L are gradually moved towards the ends of workpiece D. Then the centering seats are machined (by the tool K) on both ends of workpiece D, and the end sections thereof are turned-off (by the tool L). The working stroke of both said tools is defined by the engagement of the stops against the face of covers 130—132—134.

At the end of above cited operation, the pressurized fluid is sent, by the actuation of an associated distributor, into the right chamber of cylinder 126 (see Fig. 3), to have the units F and G quickly returned to their starting position, whereupon the distributor is actuated to connect again the cylinder 38 with the pressure generator, whereby the slides 26 are also brought back to their starting position. Finally, the pressurized fluid is fed into the lower chamber of cylinders 50, whereby the jaws 40 and 42 are opened, and the workpiece D can be taken off.

To prevent any damage of finished surfaces of workpiece D, due to possible cutting-in of tools during the backward stroke of slides 26, pressurized fluid is sent— simultaneously with the starting of return motion of the slides—into the corresponding chambers of cylinders 142. Thus a swinging motion of a given amplitude is imparted by the pistons 140 to the nuts 114, whereby a given clearance is maintained between the tips of tools M and the finished surfaces of workpiece D, during the whole return stroke of units F and G.

As soon as the slides 26 come to rest, the pressure fluid is switched over in the chambers of cylinders 142, whereby the tools will take again a starting position corresponding exactly to the desired length of workpiece D.

Changes and modifications could be made to the device according to the invention in conformity with the different operation and application requirements. Thus, only one centering unit and only one chucking unit could be provided. At least one of the chucking units B and C could have two or more cylinder-piston sets and the pairs of jaws 40—42 could be made adjustable, in respect of axes of spindles 74 and 82 according to the different diameters shown by the workpiece D. The above features could be easily embodied in the device by suitably shifting the engagement point of piston 56 with the two racks 54 and 60, thereby ensuring always the proper centering of workpiece D, whatever its diameter may be. The hydraulic equipment could also be made in such a manner as to allow a cyclic actuation of different devices in due sequence and this particularly when a wholly automatic machine is required.

It will be understood that like mechanical and/or electromechanical devices could be used for the aforedescribed hydraulic equipment; thus the axial motion which in the present specification has been shown as controlled by the screws 116, could be obtained by means of mechanical controls.

While the invention has been described with some details, it is to be understood that the description is for the purpose of illustration only, and is not definitive of the limits of the inventive idea. The right is reserved to make such changes in the details of construction and arrangement of parts as will fall within the scope of the attached claims.

We claim:

1. A device for providing centering seats on the ends of bars, forgings or the like and facing the same comprising a base, means for holding centering and facing tools for operating on each end of a workpiece slidably mounted upon said base, means for adjusting the mutual distance between said tool holding means, two pairs of clamping jaws for holding said workpiece slidably mounted on said base at right angles to the rotation axis of said tool holding means and disposed at an angle to a horizontal plane, means for locking said workpiece clamping jaws and said tool holder means at any desired position, controlling means for actuating said tool holder means against the ends of said workpiece, said tool holder means comprising a pair of coaxial spindles, a motor for driving said spindles, a centering drill mounted in one of said spindles, facing tools mounted in the other of said spindles, bearing means for said spindles and means for axially shifting said spindles in unison a given stroke in order to engage said centering and facing tools with each end face of said workpiece.

2. A device as set forth in claim 1 wherein said spindle shifting means comprises screw-and-nut means and a control hand wheel to set said spindles in the required position.

3. A device as set forth in claim 1 wherein bearing means for said spindles is box-shaped and means are fitted therein to drive said two spindles at the required speed and independently from one another.

References Cited in the file of this patent

UNITED STATES PATENTS

| | | |
|---|---|---|
| 363,874 | Place | May 31, 1887 |
| 603,888 | Brewer | May 10, 1898 |
| 1,436,860 | Church | Nov. 28, 1922 |
| 1,594,903 | Gray | Aug. 3, 1926 |
| 1,956,110 | Turrettini | Apr. 24, 1934 |
| 2,007,564 | Dixon | July 9, 1935 |
| 2,332,365 | Beebe | Oct. 19, 1943 |
| 2,464,156 | Sandersen | Mar. 8, 1949 |
| 2,545,344 | Crawford | Mar. 13, 1951 |
| 2,548,188 | Armitage | Apr. 10, 1951 |
| 2,656,820 | Becker | Oct. 27, 1953 |
| 2,701,482 | Otto | Feb. 8, 1955 |
| 2,713,283 | Lomazzo | July 19, 1955 |